United States Patent [19]
Graybill

[11] 3,829,642
[45] Aug. 13, 1974

[54] TEE CONNECTION FOR HIGH VOLTAGE, HIGH PRESSURE OIL, PIPE TYPE CABLES

[75] Inventor: Howard W. Graybill, Greensburg, Pa.

[73] Assignee: I-T-E Imperial Corporation, Spring House, Pa.

[22] Filed: Feb. 8, 1973

[21] Appl. No.: 330,582

[52] U.S. Cl. .......................... 200/148 R, 174/21 R
[51] Int. Cl. ........................................... H01h 33/60
[58] Field of Search..... 200/148 R; 174/17.06, 31.5, 174/21 R, 21 C, 22 R, 22 C, 71 R

[56] References Cited
UNITED STATES PATENTS
3,546,356 12/1970 Graybill et al. ................... 174/21 C
3,553,397 1/1971 Schmitz............................ 200/148 R FOREIGN PATENTS OR APPLICATIONS
1,136,067 12/1968 Great Britain .................... 174/21 C Primary Examiner—Robert S. Macon
Attorney, Agent, or Firm—Ostrolenk, Faber, Gerb & Soffen

[57] ABSTRACT

A tee connection for pipe type cables immersed in oil under pressure. The cable terminations are capped with insulation cones which also serve as the oil seat at the termination. The insulating cones project into a tee enclosure, and the cable terminations are electrically coupled by bus bars arranged in a tee connection. The tee connection is surrounded by an elestrostatic shield, and the tee enclosure is filled with a gas (for example, $SF_6$) under pressure.

4 Claims, 3 Drawing Figures

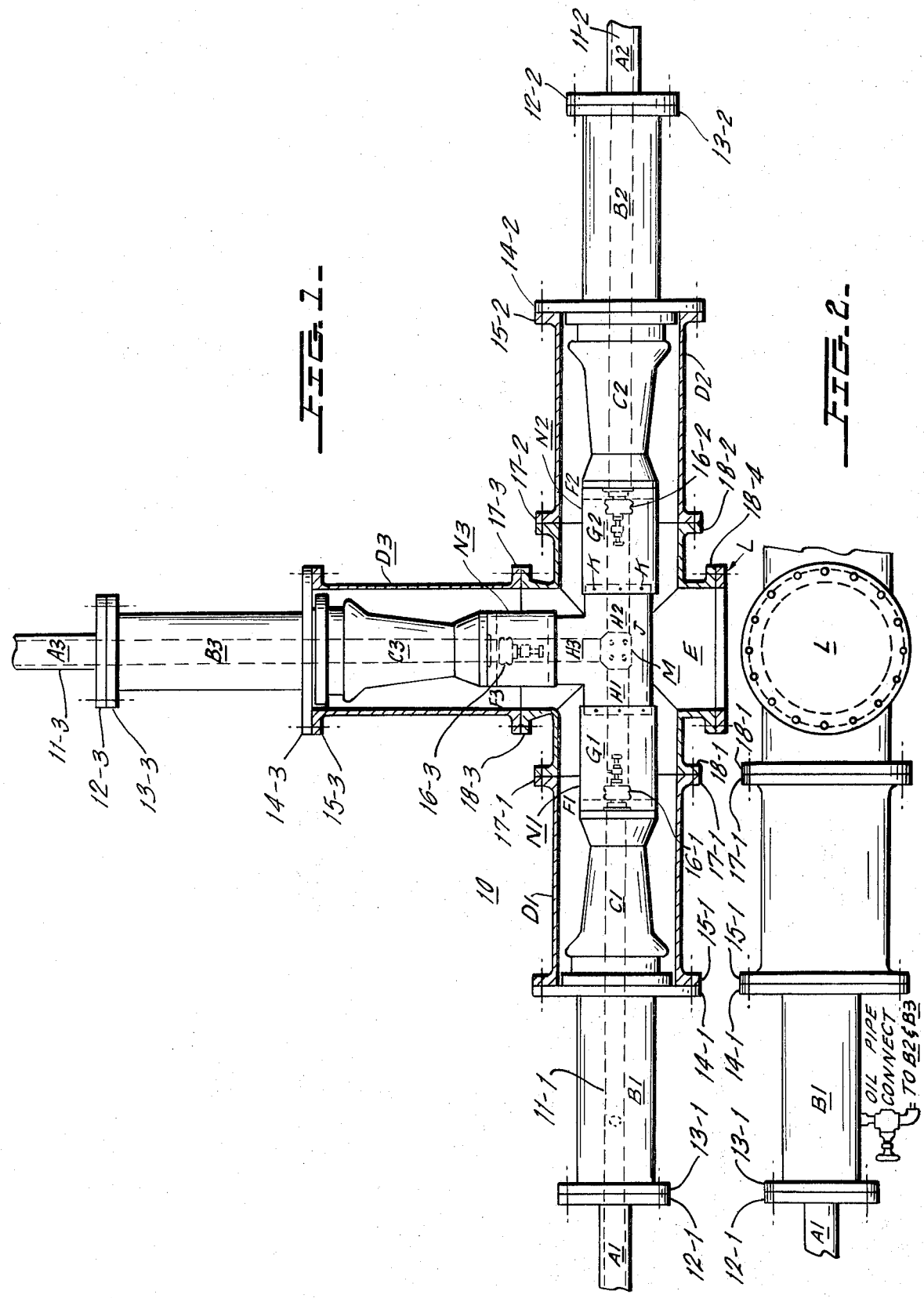

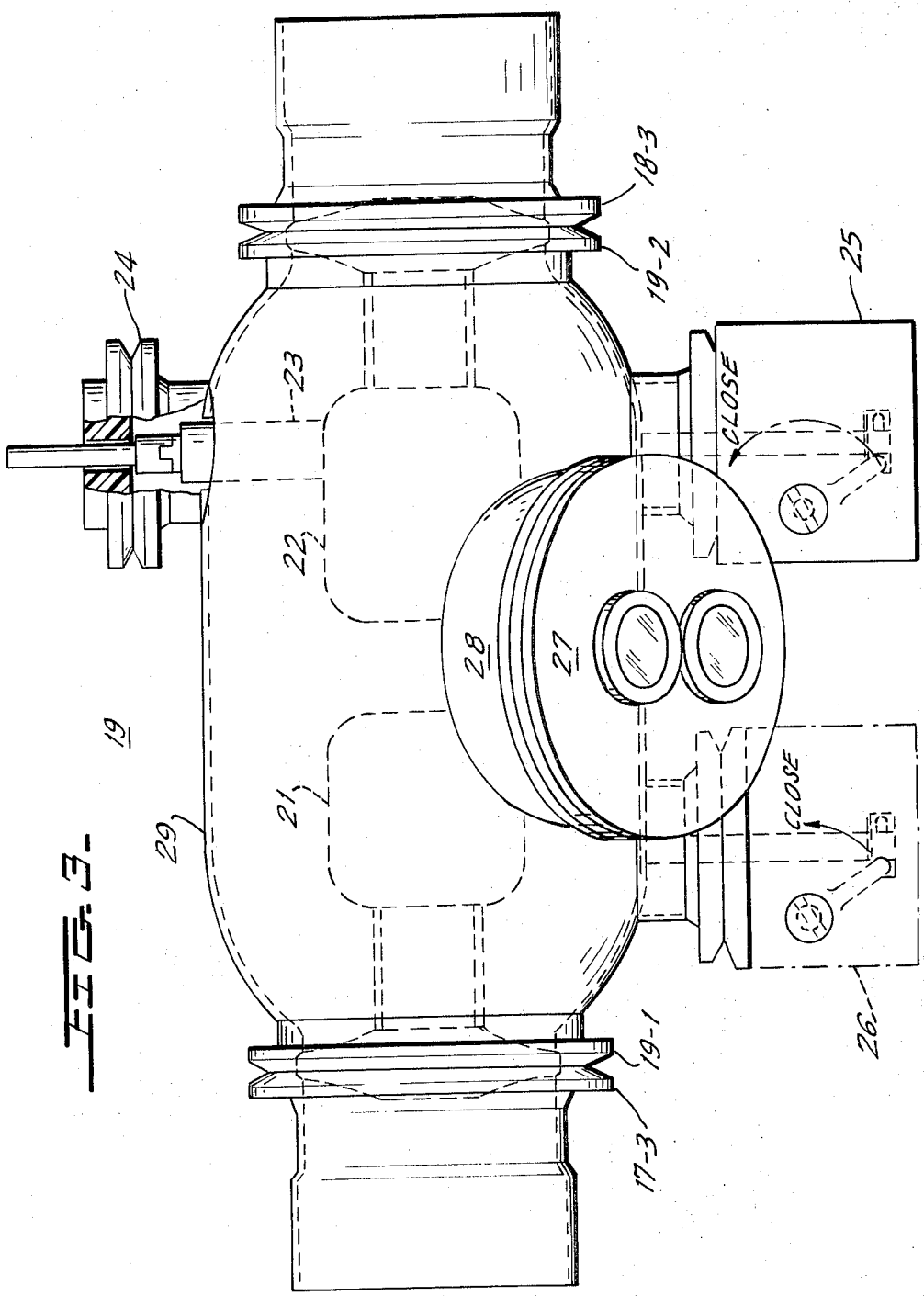

TEE CONNECTION FOR HIGH VOLTAGE, HIGH PRESSURE OIL, PIPE TYPE CABLES

The present invention relates to tee connections and more particularly to a novel tee connection for use with high voltage, high pressure oil pipe type cables, wherein the tee connection enclosure is substantially maintained at or near ground potential to eliminate the danger of electrocution and reduce corrosion and is further filled with an insulating gas to significantly reduce the required phase-to-phase and phase-to-ground clearances.

BACKGROUND OF THE INVENTION

In the past several decades, pipe type cables have come into common usage, especially in the United States, for underground transmission of electric power in the 75–400 megawatt range, at voltages ranging from 69,00–345,000 volts. Cables of the above type consist essentially of a central, multiplestrand cable (usually copper or aluminum), machine wrapped paper insulation, a grounded sheet of electrically conductive material, and a helically wound metal skid wire to protect the paper insulation. Three such cables, one for each phase, are pulled into a welded metal pipe (usually steel). Near the terminals, the three cables are separated in a large metal box (trifurcator), from which they extend to the terminator or pothead in separate, single phase pipes, which preferably are nonmagnetic material such as, for example, stainless steel. The entire system, from potheads on the one end to potheads on the other end, is carefully evacuated to remove moisture and gasses, and is then filled with oil which is normally pressurized to 200 pounds per square inch gauge.

All of this equipment, and procedures for its manufacture and installation, are well known in the industry, and pipe type cables have, on the whole, given satisfactory and reliable service. There has, however, been one salient disadvantage to pipe type cables: there has been no satisfactory and relatively inexpensive way of making a tee tap in a pipe type cable; cables can run only from one terminal to another. Of course, a tee tap can be made by terminating each portion of the cable to be tapped, so that in effect there are three cables, one of which is a continuation of the other, and the third is a takeoff or tap usually arranged at right angles to the first two. However, in many cases, it is often desirable to make such taps in underground vaults. If the connections between the three cables are made in open air, phase and ground clearances of about 5' and 4', respectively, are required for 115 kilovolts, and 10' and 9', respectively, are required for 345 kilovolts. It can readily be seen that the size of underground vaults required to make such connections would be very great. Also, such a connection would be very unsafe, as any workman entering into the vault for any reason could come too close to the open high-voltage connections between potheads, and be electrocuted.

BRIEF DESCRIPTION OF THE INVENTION AND OBJECTS

It is therefore one object of the present invention to provide a means for making a connection between three separate cables to form a tee connection, in a much smaller space than that required if such a connection is made in air at atmospheric pressure.

A further object of the present invention is to provide such connections within metal enclosures which are at or near ground potential, so that workmen in the vault cannot possibly be harmed by touching any exterior portions of the equipment, even when the cables and interconnections are operating normally at full voltage.

In the arrangement of the present invention, the pipe type cables are terminated by porcelain cones, secured to the encircling pipes, and in turn securing the terminations of the cable, so as to serve as an end cap for sealing the oil under pressure contained therein. The porcelain cones each project into a tee shaped enclosure, with the terminations of the cables being coupled by means of a tee shaped bus bar arrangement, surrounded by an electrostatic shield. The tee shaped enclosure is pressurized with an insulating gas permitting clearances between the high-voltage parts and the enclosure of the order of a few inches, and further permitting extremely close spacing between tee-shaped enclosures of adjacent phases.

BRIEF DESCRIPTION OF THE FIGURES

The above, as well as other objects of the present invention will become apparent when reading the accompanying description and drawings in which:

FIG. 1 is a top view of a single phase tee connection, embodying the principles of the present invention.

FIG. 2 is a side, elevational view of the arrangement of FIG. 1.

FIG. 3 shows a gas insulated disconnect switch which may be incorporated in the embodiment of FIG. 1.

DETAILED DESCRIPTION OF THE FIGURES

FIG. 1 shows a top plan view, partially sectionalized, of one phase of a multi-phase system, adapted for use in systems of 115 or 138 kv nominal voltage through systems of 230–345 kv service which requires only dimensional changes in the system components to accommodate the higher voltage service. Whereas the embodiment of FIGS. 1 and 2 shows one phase of a multi-phase system, it should be understood that the phases of a multi-phase (three phase system, for example) are mounted vertically above one another within the closest spacing practical while allowing adequate clearance for access to all removable fastening members and other components so provided for maintenance purposes.

As shown in FIG. 1, the cables 11-1 through 11-3 (shown in dotted fashion) extend through their pipes A-1, A-2, and A-3 respectively, to the dotted lines F-1, F-2, and F-3 respectively, where they are subsequently secured in a manner to be more fully described. Pipes A-1, A-2, and A-3 are secured by their flanges 12-1 through 12-3 respectively, to the flanges 13-1 through 13-3 respectively, of pothead bodies B-1, B-2, and B-3. Suitable gaskets and fastening members secure the flanges to one another. The pipes A-1 through A-3 and the pothead bodies B-1 through B-3 are filled with oil at high pressure, usually up to 200 psig. The oil extends up and into the hollow conical porcelain bushings C-1, C-2, and C-3, to the bleed valves G-1, G-2, and G-3. Housings D-1, D-2, and D-3 are each secured through their flanges 15-1, 15-2, and 15-3 respectively to the flanges 14-1, 14-2, and 14-3 of the pothead bodies B-1, B-2, and B-3, again utilizing suitable gaskets and fastening members for providing a gastight seal thereat. The terminations of the cables 11 as shown at 16-1, 16-2, and 16-3 are electrically connected by means of the hollow bus bars H-1, H-2, and H-3 shown in dotted fashion. The free ends of these bus bars are coupled by means of a center connection M which may be either bolted or welded to the free ends of the bus bars, to form an electrical tee connection. The internal components maintained at high voltage are surrounded by electrostatic shields N-1, N-2, N-3, and J to form a relatively smooth cylindrical exterior surface around the high-voltage gradients created between and among the elements maintained at high voltage and the surrounding enclosure which is maintained at or near ground potential.

The housings D-1, D-2, and D-3 are further secured to a central tee-shaped housing E by means of flanges 17-1, 17-2, and 17-3, which mate with the flanges 18-1, 18-2, and 18-3 of the central enclosure member E. A cover or lid L is secured to flange 18-4 of enclosure E by suitable fastening means which are adapted to be removable to permit access to the interior of the enclosure. The composite enclosure comprised of housings D-1, D-2, D-3 and E is filled with an insulating gas such as sulphur hexafluoride ($SF_6$) or hexafluoroethane ($C_2F_6$) or octafluorocyclobutane ($C_4F_8$), under a positive pressure of less than 100 psig. The pressurized insulating gas permits a small ground clearance of a few inches between the high voltage parts and the enclosure.

Three phases, each of a design of the type shown in FIGS. 1 and 2, are supported, vertically above one another, and insulated from ground with a voltage difference of the order of a few volts. The reason for insulating the entire system from ground is to permit a cathodic voltage bias, usually not over one volt d.c., to be imposed on the cable pipes to retard their corrosion. The cathodic bias may be provided by a rectifier, or by connecting the entire system to buried anodes of aluminum, zinc, magnesium, or any other metal that ia anodic with respect to steel. The science of cathodic protection is well known in the cable industry.

If desired, a switch similar to that shown in FIG. 3 may be inserted in the tee enclosure arrangement between the housing sections D-3 and E, for example, wherein the flanges 17-3 and 18-3 of enclosures D-3 and E respectively, engage the flanges 19-1 and 19-2 of the pressurized gas-filled disconnect switch 19. The switch comprises a telescoping tubular metal blade, extendable and retractable between electrostatically shielded contacts, with the electrostatic shields 21 and 22 being provided for the switch jaw and switch blade contacts respectively. The blade is actuated by rotating an insulating shaft 23 through a gasketed opening 24 provided in the housing. Such switches have been built, tested, and installed, and are now in commercial service. Grounding switches 25 and 26 are incorporated to make sure the interior high-voltage conductor is de-energized and grounded before workmen remove the access cover for maintenance of interior parts. The access cover is shown as comprising a manhole type cover 27 secured to a projection 28 provided along the housing wall 29 of the disconnect switch. Use of the disconnect switch in the manner shown enables the tap to be disconnected and reconnected to the main cable run, either manually and locally, or electrically and from a remote point, as needed. Also, switches can also be mounted in the main cable run between enclosure sections D-1 and D-2 and enclosure section E, if it is necessary or desirable to insert switches at this point.

The procedural steps for assembling the tee connection are as follows:

The stainless steel pipe sections A-1, A-2, and A-3 are precisely positioned upon insulating mounts (not shown for purposes of simplicity). The pipes are then welded to outgoing pipes connected thereto. The cables are pulled through the pipes A-1 through A-3 and cut so as to terminate at the appropriate positions. The skid wire is removed as far as flanges 12-1, through 12-3, and is terminated in an electrically and mechanically sound connection to flange 12-1, etc. The outer conducting layer over the cable insulation is also removed to this point. A stress cone is then built up by wrapping oil-soaked paper around the cable insulation from the vicinity of flange 13-2 to a point near the end of the porcelain cone. The outer surface of this paper cone increases gradually from the outside diameter of the cable to a substantially larger diameter, on a logarithmic or exponential curve, to the approximate vicinity of flange 14-2, and then it is gradually penciled down (i.e., tapered) to the outside diameter of the cable insulation near the cable terminal.

The pothead bodies B-1 through B-3 are installed over the stress cones with appropriate gaskets, so as to be secured to the associated pipe flanges. Compression connectors which are solid copper rods having one of their ends drilled out to the exact outside diameter of the cable conductors are then mounted on the ends of the cables by pushing each conductor into the aforesaid drilled holes to a proper depth. Compression tools are employed to squeeze the connector rigidly to the cable, the deformation of the metal being such that the connector is rigidly and permanent bonded, mechanically and electrically, to the cable. The porcelain cones C-1 through C-3 are then installed by bolting gasketed metal flanges at the large diameter end of the cones to the flanges 14-1 through 14-3. The top covers are similarly bolted to flanges mounted on the small diameter end of the cone, with suitable gasketing to prevent leaks. Also there are O-ring gaskets where the cylindrical compression connector extends through the top cover, and these O-rings are clamped in such a manner as to assure a leaktight joint at this point.

Enclosure tubes D-1, D-2, and D-3 are then suitably gasketed and secured to the flanges of the pothead bodies B-1 through B-3. Housing section E is then bolted into place after having removed access cover L. The electrostatic shield tubes F-1, F-2, and F-3 are put into place and temporarily telescoped down over the porcelain cones. Bleed valves G-1, G-2, and G-3 are then secured to top covers of the porcelain cones to make sure all air is bled out of the system at this point, and that the cones are completely filled with oil. In other words, electroststic shield tubes F-1, F-2, and F-3 cannot be put into their final position until after the entire oil system of A-1, B-1, and C-1, for example, has been evacuated, leak tested, and filled with oil, because after the shield tubes F-1, F-2, and F-3 are in place, there can be no further access to the bleed valves.

After it has been ascertained that the three cable systems are leaktight, and after they have been filled with oil, then bus bars H-1, H-2, and H-3 are then electrically connected to the terminations of the cables. The electrostatic shields are then slid outwardly from their telescoping position, one at a time. For example, electroststic shield N-1 is moved to the right from its telescoping position over insulating cone T-1 until it occupies a position shown in FIG. 1, whereupon the electrostatic shield J, which is preferably in two half sections, is held one section at a time in alignment with shield N-1 and secured thereto by sheet metal screws K until both shield sections of shield J are secured to shield N-1. This arrangement is repeated for the shield tubes F2 and F3. The interior is then cleaned to remove any foreign particles, the access cover L is replaced, and the enclosure is pressurized with insulating gas.

It can be seen from the above that I have invented a novel method and accompanying hardware for providing a compact, safe method of making a tee connection between high-voltage oil filled pipe type cables in an underground vault. The tee connection can withstand flooding of the vault without interruption of electrical service due to the air-tight as well as water-tight seals provided for each pair of cooperating flanges within the assembly. The arrangement further provides for the employment of disconnecting and grounding switches which may be employed in any one or all three of the cable branches entering into the tee connection.

Although there has been described a preferred embodiment of this novel invention, many variations and modifications will now become apparent to those skilled in the art. Therefore, this invention is to be limited not by the specific disclosure herein, but only by the appending claims.

The embodiments of the invention in which an exclusive privilege or property is claimed are defined as follows:

1. A tee-connection for use with high voltage cable assemblies, said assemblies comprising a cable mounted within an oil-filled conduit; said connection comprising a hollow metallic tee-enclosure;
   the end of each assembly being terminated by a pothead;
   each of said potheads extending into an associated arm of said tee-enclosure;
   an electrical tee-connector connecting the cable terminations at the free ends of said potheads, said connector comprising three bus bars and a center connector joining the inner ends of the bus bars, the outer ends of the bus bars each being connected to one of said potheads;
   said enclosure being maintained near ground potential and being filled with pressurized insulating gas;
   said tee-enclosure having a removable cover positioned adjacent the center of the tee-connector.

2. A tee-connection as described in claim 1, wherein one or more disconnecting switches are incorporated in the insulating gas enclosure, and located between the pothead terminal or terminals, and the common point of the tee electrical connection, in which the switch consists of a tubular blade extended and retracted between a pair of spaced, electrostatically shielded contacts by rotating an insulated shaft from a point outside the metal housing, one of said contacts being connected to said pothead terminal, and the other being connected to the common point of the tee connection.

3. A tee-connection as described in claim 1, wherein one or more grounding switches are incorporated in the insulating gas, said grounding switch or switches each cosisting of a metal rod or blade, a set of electrostatically shielded contacts on the interior high-voltage conductor, another set of contacts incorporated in the metal housing, means for extending the said rod or blade so that it simultaneously engages both of said contacts, and for retracting said blade into the housing walls, and sealing means for preventing leakage of gas from said housing.

4. The apparatus of claim 1 wherein each pothead is comprised of a hollow insulating cone spanning the gap between said conduit and said cable for sealing the oil therein and having its exterior exposed to said insulating gas.

* * * * *